United States Patent
Hou

(10) Patent No.: US 12,244,000 B2
(45) Date of Patent: Mar. 4, 2025

(54) BATTERY CATHODES FROM HUMIC ACID

(71) Applicant: University of North Dakota, Grand Forks, ND (US)

(72) Inventor: Xiaodong Hou, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 591 days.

(21) Appl. No.: 17/558,080

(22) Filed: Dec. 21, 2021

(65) Prior Publication Data

US 2022/0123316 A1    Apr. 21, 2022

Related U.S. Application Data

(63) Continuation of application No. PCT/US2021/044488, filed on Aug. 4, 2021.

(60) Provisional application No. 63/124,487, filed on Dec. 11, 2020, provisional application No. 62/706,191, filed on Aug. 4, 2020.

(51) Int. Cl.
| | |
|---|---|
| *H01M 4/133* | (2010.01) |
| *H01M 4/02* | (2006.01) |
| *H01M 4/04* | (2006.01) |
| *H01M 4/1393* | (2010.01) |
| *H01M 4/587* | (2010.01) |
| *H01M 4/62* | (2006.01) |
| *H01M 4/66* | (2006.01) |
| *H01M 10/0525* | (2010.01) |

(52) U.S. Cl.
CPC ......... *H01M 4/133* (2013.01); *H01M 4/0416* (2013.01); *H01M 4/1393* (2013.01); *H01M 4/587* (2013.01); *H01M 4/62* (2013.01); *H01M 4/621* (2013.01); *H01M 4/661* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,691,441 B2 | 4/2014 | Zhamu et al. | |
| 2009/0111028 A1* | 4/2009 | Lee | H01M 10/0567 429/324 |
| 2010/0112447 A1 | 5/2010 | Yamamoto et al. | |
| 2010/0203392 A1 | 8/2010 | Yamada et al. | |
| 2013/0140495 A1* | 6/2013 | Beall | C08K 5/053 252/500 |
| 2014/0220233 A1 | 8/2014 | Huang et al. | |
| 2015/0118554 A1 | 4/2015 | Wu et al. | |
| 2016/0069963 A1* | 3/2016 | Hebiguchi | G01R 31/389 324/430 |
| 2018/0053930 A1 | 2/2018 | Zhamu et al. | |
| 2018/0054921 A1 | 2/2018 | Zhamu et al. | |
| 2022/0115641 A1* | 4/2022 | Hou | H01M 4/133 |

OTHER PUBLICATIONS

Xu, S., Zhou, J., Wang, J., Pathiranage, S., Oncel, N., Ilango, P.R., Zhang, X., Mann, M., Hou, X.—In Situ Synthesis of Graphene-Coatedf Silicon Monoxide Anodes from Coal-Derived Humic Acid for High-Performance Lithium-Ion Batteries, https://onlinelibrary.wiley.com/doi/full/10.1002/adfm.202101645 (Year: 2021).*
DeSouza, F., Braganca, S.R.—Extraction and characterization of Humic acid from coal for the application as dispersant of ceramic powders, Journal of materials Research and Technology, Jul. 2018, (3), pp. 254-260 (Year: 2018).*
Xing, B., Yuan, R., Zhang, C., Huang, G., Guo, H., Chen, Z., Chen, L., Yi, G., Zhang, Y., Yu, J.—facile synthesis of graphene nanosheets from humic acid for supercapacitors, Fuel Processing Technology, 165 (2017), pp. 112-122 (Year: 2017).*
International Search Report and Written Opinion from PCT Application Serial No. PCT/US2021/044488, dated Nov. 8, 2021, 7 pages.
International Preliminary Report on Patentability for PCT Application Serial No. PCT/US2021/044488, dated Feb. 16, 2023, 6 pages.

* cited by examiner

*Primary Examiner* — Anca Eoff
(74) *Attorney, Agent, or Firm* — Kinney & Lange, P.A.

(57) ABSTRACT

A method of producing a cathode material for a lithium-ion battery includes combining an electrode precursor material and humic acid in an alkaline slurry, drying the alkaline slurry to produce a powder of humic acid-coated electrode precursor material, and heating the powder to produce the electrode material comprising graphene-coated particles.

22 Claims, 5 Drawing Sheets

BATTERY CATHODES FROM HUMIC ACID

CROSS-REFERENCE TO RELATED APPLICATION(S)

This application is a continuation of PCT Application No. PCT/US2021/044488 for "Battery Materials and Fabrication Methods," filed Aug. 4, 2021, which claims the benefit of U.S. Provisional Application No. 62/706,191 for "Battery Structures and Fabrication Methods," filed Aug. 4, 2020, and U.S. Provisional Application No. 63/124,487 for "Battery Materials and Fabrication Methods," filed Dec. 11, 2020.

BACKGROUND

The present disclosure is related generally to lithium-ion batteries, and more specifically to methods of producing lithium-ion battery electrode materials.

Lithium-ion battery (LIB) technology is a source of high-energy, lightweight power that has yet to be rivaled in terms of performance among commercial battery technologies. To improve the electrical properties of LIBs, carbon is often added to the electrode materials. Polyanion electrodes, such as lithium iron phosphate (LFP) cathodes and lithium iron orthosilicate, benefit from added carbon to overcome inherently low conductivity in the active material. Carbon is typically added from sources such as sugars, graphite, or carbon black. Graphene is a desirable material for LIB technology due to its electrical and mechanical properties but is costly and has posed multiple challenges.

One of the challenges of incorporating graphene into various LIB electrode chemistries is ensuring an adequate and even mixture that will result in a uniform carbon coating. Direct mixing of active particles with graphene has produced unsatisfactory results due to the tendency of graphene flakes to form agglomerates and poor interaction between the graphene and electrode particles via "dot-on-plane" contact. Pure graphene and reduced graphene oxide (rGO), which has also been investigated, are composed of dominant carbon atoms with very few functional groups. Due to the hydrophobic nature of graphene and rGO, poor interaction between graphene and the electrode particles occurs upon mixing. Graphene agglomerates can block the diffusion of lithium ions, resulting in heavy polarization and higher irreversible capacity, and can also create extreme difficulty in coating the electrode composite on a current collector. Furthermore, research has shown that full graphene wrapping of LFP particles can isolate LFP particles from the electrolyte and inhibit lithium ion diffusion.

Graphene-coated silicon materials have been viewed as promising anodes for next-generation LIBs. Silicon has a high theoretical capacity of 4200 mAh/g and low operating voltage (i.e., <1V vs. $Li/Li^+$), but has a large volume change during lithiation/delithiation that can cause fracture of the silicon particles, delamination of the conductive coating, and thus rapid capacity decay upon cycling. Despite significant progress, the inability to sufficiently remedy the large volume change has limited its practical use. The most common remedies have included nano-sized structures, surface coating development, and porosification of silicon; however, each has its limits. Nano-sized structures have been shown to better withstand stress and limit cracking due to volumetric change of silicon, resulting in a longer cyclic life. They also present a shorter diffusion distance for lithium ions, thus leading to a high rate capability. However, the large specific surface area causes low first-cycle efficiency. In addition, the low pressing density of such structures leads to low volumetric energy density, and the well-known agglomeration issue of nanomaterials will cause a heavy polarization and higher irreversible capacity.

A flexible but tough conductive coating can improve the first cycle Columbic efficiency and cycling performance. Unfortunately, poor interaction between the hydrophobic graphene and silicon results in a non-uniform coating. Additionally, a tight graphene coating can create blocked lithium ion pathways, leading to a large charge transfer resistance.

Porous silicon can effectively release the stress created by the large volume expansion of silicon and increases the accessibility of the electrolyte to the silicon surface, shortening lithium ion diffusion pathways and increasing rate capability. Unfortunately, the technical challenges of providing a graphene coating remain.

Besides the technical challenges, the high cost of graphene has limited its practical use in LIB technology. Currently, mainstream efforts toward scalable, synthesized graphene use graphite as raw materials by a chemical exfoliation and reduction method via a classic or modified Hummers' approach to produce reduced graphite oxide. Apart from the harsh reaction conditions and hazardous environmental impact, the rapidly increasing price of graphite has driven a search for alternative raw materials and low-cost procedures for scalable synthesis of graphene. A promising alternative is coal, which is a much more abundant and less expensive resource than graphite. Humic acid is the major organic component of coal. Recent research has shown that humic acid can be made into graphene-like materials with quality comparable to the reduced graphite oxide. Unfortunately, graphene prepared by previously proposed approaches cannot be directly applied to synthesize electrode materials for LIB s because of the ash content and significant amount of metallic impurities. Furthermore, the challenges of directly coating electrode particles with graphene remain, regardless of the source of graphene—the hydrophobic nature of graphene produces nonuniform coatings and aggregates of graphene and tight wrapping limit lithium ion transport.

Improved methods for making lithium-ion battery electrode materials that provide improved performance at reduced manufacturing costs are needed.

SUMMARY

In one aspect, a method for producing high purity humic acid from coal includes dissolving coal in an aqueous alkaline solution, removing undissolved material from the aqueous alkaline solution to obtain a humate aqueous solution, acidifying the humate aqueous solution to precipitate ash, removing the ash precipitate to obtain a raw humic acid solution, acidifying the raw humic acid solution to precipitate raw humic acid, and removing metal ion impurities from the raw humic acid to produce humic acid having a purity greater than 98%.

In another aspect, a method of producing an electrode material for a lithium-ion battery includes combining an electrode precursor material and humic acid in an alkaline slurry, drying the alkaline slurry to produce a powder of humic acid-coated electrode precursor material, and heating the powder to produce the electrode material comprising graphene-coated particles.

In yet another aspect, a method of producing an anode material for a lithium-ion battery includes combining an electrode precursor material and humic acid in an alkaline slurry, drying the alkaline slurry to produce a powder of humic acid-coated electrode precursor material, and heating the powder to produce the electrode material comprising graphene-coated particles.

In yet another aspect, a method of producing a cathode material for a lithium-ion battery includes combining an electrode precursor material and humic acid in an alkaline slurry, drying the alkaline slurry to produce a powder of humic acid-coated electrode precursor material, and heating the powder to produce the electrode material comprising graphene-coated particles.

The present summary is provided only by way of example, and not limitation. Other aspects of the present disclosure will be appreciated in view of the entirety of the present disclosure, including the entire text, claims and accompanying figures.

Figure 1:
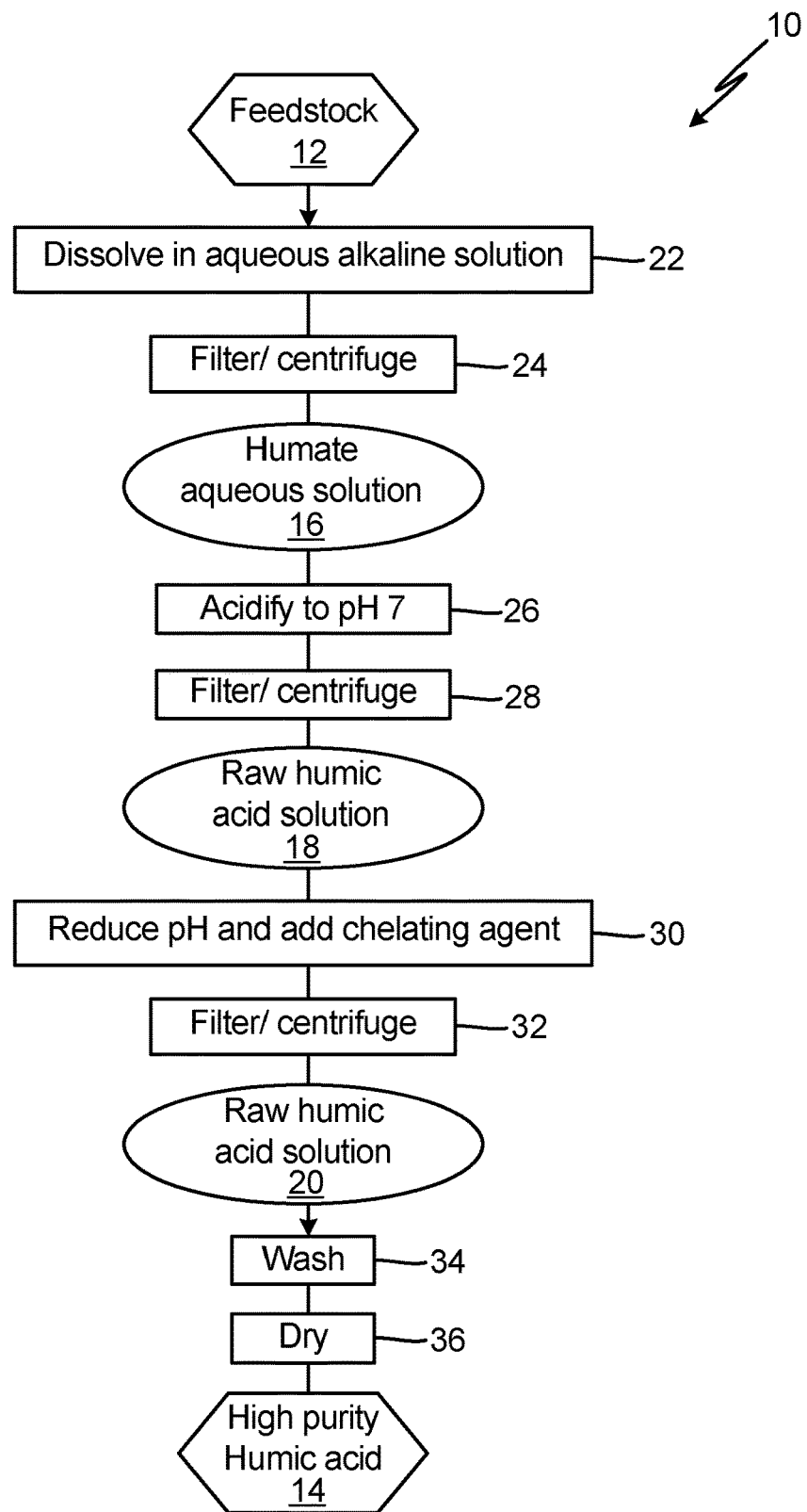
FIG. 1 is a flow diagram of a method for producing high purity humic acid from coal.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Graphene can be incorporated into electrode materials to greatly improve the performance of lithium-ion batteries (LIB) by increasing conductivity and improving cycling stability and low-temperature performance. As provided in the present disclosure, graphene-modified electrode materials can be synthesized in-situ using high purity humic acid as a graphene precursor. Humic acids are naturally occurring long-chain molecules that can be found in decayed organic matter, soil, and coal. Humic acid found in coal can have a higher molecular weight than humic acid found in soil and can be used to produce graphene molecules of large lateral dimensions. A novel and cost-effective method of producing high purity humic acid from a low-value coal is disclosed, which has potential for large-scale production. While the high percentage of humic acid available in coal makes coal a promising candidate for large-scale humic acid production, the method disclosed herein is not limited to use with coal and can be used with other sources of humic acid, such as soil or decayed organic matter.

Extraction and Purification of Humic Acid

FIG. 1 is a flow diagram of a method 10 for extracting and producing high purity humic acid from humic acid-containing feedstock. FIG. 1 shows a series of steps for converting feedstock 12 to high purity humic acid 14 through production of a series of intermediate products, including humate aqueous solution 16, raw humic acid aqueous solution 18, and raw humic acid solid 20. The steps of production are illustrated in FIG. 1 as follows:

Feedstock 12 is dissolved in an aqueous alkaline solution (step 22) and filtered (step 24) to obtain humate aqueous solution 16.

Humate aqueous solution 16 is acidified (step 26) and filtered to remove ash (step 28) to produce raw humic acid aqueous solution 18.

A chelating agent is added to raw humic acid aqueous solution 18 and the pH is lowered to 2 (step 30) to cause raw humic acid to precipitate out of solution, which is then filtered (step 32) to collect raw humic acid solid 20.

Raw humic acid 20 is washed (step 34) and dried (step 36) to produce high purity humic acid 12. As used here, the term "raw humic acid" is used to describe an unpurified humic acid or intermediate product in the purification of humic acid.

Feedstock 12 can be any source of humic acid. Preferably, feedstock 12 is a low-rank coal having a relatively high humic acid content and humic acid of high molecular weight. While humic acid occurs in moderate levels in soil, decayed plant matter, and coal, oxidized coal, and particularly Leonardite, typically has the highest humic acid content. Leonardite, which is a form of oxidized lignite coal, can contain up to 86% humic acid on a dry basis. Despite structural similarity, Leonardite has a significantly higher humic acid content than lignite. Leonardite is found throughout the world with some of the richest deposits found in North Dakota. While extraction of humic acid from other types of coal is feasible, its high humic acid content and low cost make Leonardite a good candidate for large-scale production of humic acid. Additionally, all types of coal, including Leonardite, contain humic acid having a higher molecular weight than humic acid of other sources, such as soil and decayed organic matter. The higher molecular weight humic acid can produce graphene molecules of larger lateral dimensions, which may be advantageous in LIB electrode production. Chemically, humic acid is not a single molecule but a complex mixture of thousands of organic compounds typically including aromatic nuclei with phenolic and carboxylic groups. When carbonized, chemical structure variations between the raw material feedstock are largely eliminated.

Feedstock 12 can be dissolved in an aqueous alkaline solution having a pH maintained at greater than about 9.5 (step 22). The aqueous alkaline solution can have a solid to liquid ratio of about 10-20 (m/v) %. (e.g., 1-2 g/100 mL) The abundant functional groups on humic acid make it highly soluble in alkaline solutions. A strong base can ionize the carboxylic acid groups on humic acid to form carboxylate at a low concentration such that humic acid is fully dissolved in the alkaline solution. Strong bases can include but are not limited to sodium hydroxide, potassium hydroxide, lithium hydroxide, ammonium hydroxide, sodium carbonate, and potassium carbonate. Additional base can be added as base is consumed to maintain a pH greater than 9.5.

The aqueous alkaline solution can be mixed, for example, by stirring until none of the remaining feedstock 12 is dissolved. It will be understood by one of ordinary skill in the art to provide a mass to volume ratio that limits the amount of undissolved feedstock. Feedstock 12 can be pulverized prior to being added to solution to improve dissolution. A coarser grain size (e.g., −200 mesh) may be preferred to a fine powder for ease of removing undissolved feedstock 12. A filter press, for example, works better for a larger particle size.

Humin is the insoluble component of feedstock 12 remaining following extraction of components soluble in the aqueous alkaline solution. The aqueous alkaline solution can be filtered or centrifuged to remove humin (step 24) to obtain humate aqueous solution 14. Filtering can be done by vacuum filter, filter press, or other mechanisms known in the art. The humin can be discarded as waste material. Aqueous humate solution 14 can be acidified to a pH between 6 and 7, and preferably, a pH of 7 (step 26) with hydrochloric acid to precipitate ash out of solution. Ash contains metal impurities, which if present in an electrode material could lead to failure of a lithium-ion battery. As such, ash content and metal impurities must be minimized. A pH of 7 is sufficient to precipitate ash from solution while humic acid remains in solution. If the pH is dropped below about a pH of 5, the humic acid will begin to precipitate out of solution and will be lost with the removal of ash precipitate. The ash precipitate can be removed from the aqueous solution by filtration or centrifugation (step 28) leaving raw humic acid solution 18. The removal of ash is necessary for the removal of silicon, which is one of the primary components of the ash content, iron, and other impurities detrimental to the manufacture or operation of LIB electrodes. Previous methods have used hydrofluoric acid to remove ash, which increases the complexity of manufacture and poses environmental risks. Hydrofluoric acid must be processed in a plastic container and produces toxic and volatile exhaust.

Filtration of the aqueous solution with ash precipitate can increase the amount of ash physically removed from the aqueous solution and, therefore, can be preferred to centrifugation. Filtering can be done by vacuum filter, filter press, or other mechanisms known in the art. The ash can be discarded as waste material. The hydrated humic acid is a colloid suspension, which can be difficult to filter. Sequential filtration can provide an effective means for preventing build-up of insoluble material and thereby prevent filter blockage. Ash content remaining in raw humic acid solution 18 following filtration can be less than 2% and has been demonstrated to be less than 1% and less than 0.5% using the disclosed method.

The pH of raw humic acid solution 18 can be reduced to about 4 and a chelating agent can be added (step 30) to remove impurities from the humic acid. The chelating agent can be a water-soluble small organic molecule or polymer that contains multiple negatively charged functional groups, such as carboxylic acid, phosphonic acid, sulfonic acid, and their salts. The chelating agent forms water-soluble coordination compounds between the functional groups of the chelating agent and metal ions (impurities) of the humic acid. Chelating agents can include but are not limited to EDTA. About 1 g/100 mL chelating agent can be added to raw humic acid solution 18. The solution can be mixed by stirring and the pH can be further lowered to about 2 to cause the raw humic acid to precipitate out. The pH of raw humic acid solution 18 can be lowered with hydrochloric acid. Following precipitation, the solution can be filtered or centrifugated to remove the raw humic acid precipitate (step 32), yielding raw humic acid 20 in solid form.

Raw humic acid solid 20 can be repeatedly washed with dilute acid and water (step 34) and then dried at a low temperature (step 36). The washing and drying steps 34, 36 can be repeated to obtain high purity humic acid 12. The wash-after-dry method with low temperature drying can improve removal of impurities. The wet raw humic acid precipitated from raw humic acid solution 18 is a colloid suspension that contains 50-100% moisture due to the strong hydrogen bonding between abundant polar and hydrophilic functional groups and water molecules. Water-soluble impurities, including salts and coordination compounds, will be trapped in the colloidal solution. Drying at a low temperature can remove the water thereby breaking hydrogen bonding and exposing the trapped impurities, which can be released in the subsequent washing step. Drying step 36 can be conducted at a temperature of less than about 70° C. Temperatures higher than 70° C. can cause the material to clump together, which then requires repulverization prior to washing. Drying can be conducted in an oven or spray drier. The disclosed wash-after-dry method can provide high purity humic acid and is preferable to prior methods of dialysis utilizing semi-permeable membranes, which are time-consuming and water-consuming.

EXAMPLE 1

Humic acid was extracted and purified from a sample of Leonardite coal containing approximately 86% humic acid. The Leonardite coal pulverized to a particle size of −200 mesh and was dissolved in an aqueous alkaline solution of sodium hydroxide having a solid to liquid ratio of 10 (m/v) %. The mixture was stirred for approximately one hour until no additional coal was dissolved. The pH was maintained above 9.5. The aqueous alkaline solution was filtered using a vacuum filter to remove the insoluble humin content and obtain a humate aqueous solution. The humate aqueous solution was acidified to a pH of 7 with hydrochloric acid to precipitate ash out of solution. The ash precipitate was removed by filtration to obtain a raw humic acid solution having an ash content of approximately 1.5% The pH of the raw humic acid solution was lowered to a pH of 4 with the addition of hydrochloric acid and about 1 (m/v) % EDTA was added as a chelator to form water-soluble coordination compounds between functional groups of the chelator and metal ions of the humic acid. The solution was mixed by stirring for about one hour. The pH was further reduced to a pH of 2 with the addition of hydrochloric acid to precipitate raw humic acid from solution. The solution was filtered to remove the raw humic acid precipitate, yielding raw humic acid in solid form. The raw humic acid was repeatedly washed with dilute hydrochloric acid and water and dried at a temperature of about 70° C. The dried humic acid was washed with dilute hydrochloric acid and water to remove impurities (metal ions) exposed in the drying process and produce purified humic acid. The purified humic acid was analyzed by an X-ray fluorescence spectrometer and determined to have a purity of 98.76% with an ash content of 1.24%.

In-Situ Synthesis of Graphene-Coated Electrode Materials for Li-Ion Battery

Figure 2:
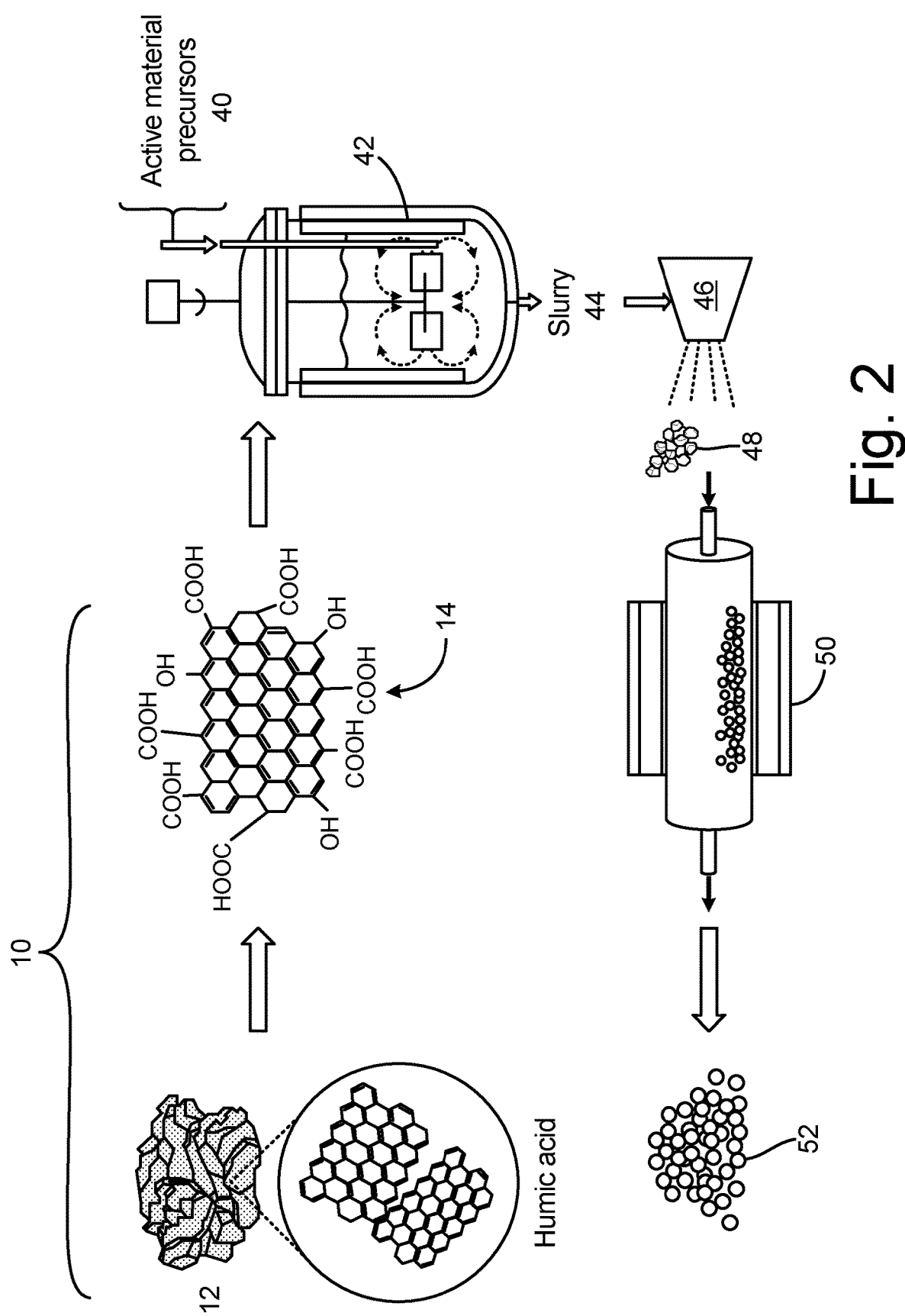
FIG. 2 is a flow diagram of a method for producing a graphene-coated electrode material using the high purity humic acid produced using the method of FIG. 1 for lithium-ion batteries.
Figure 3:
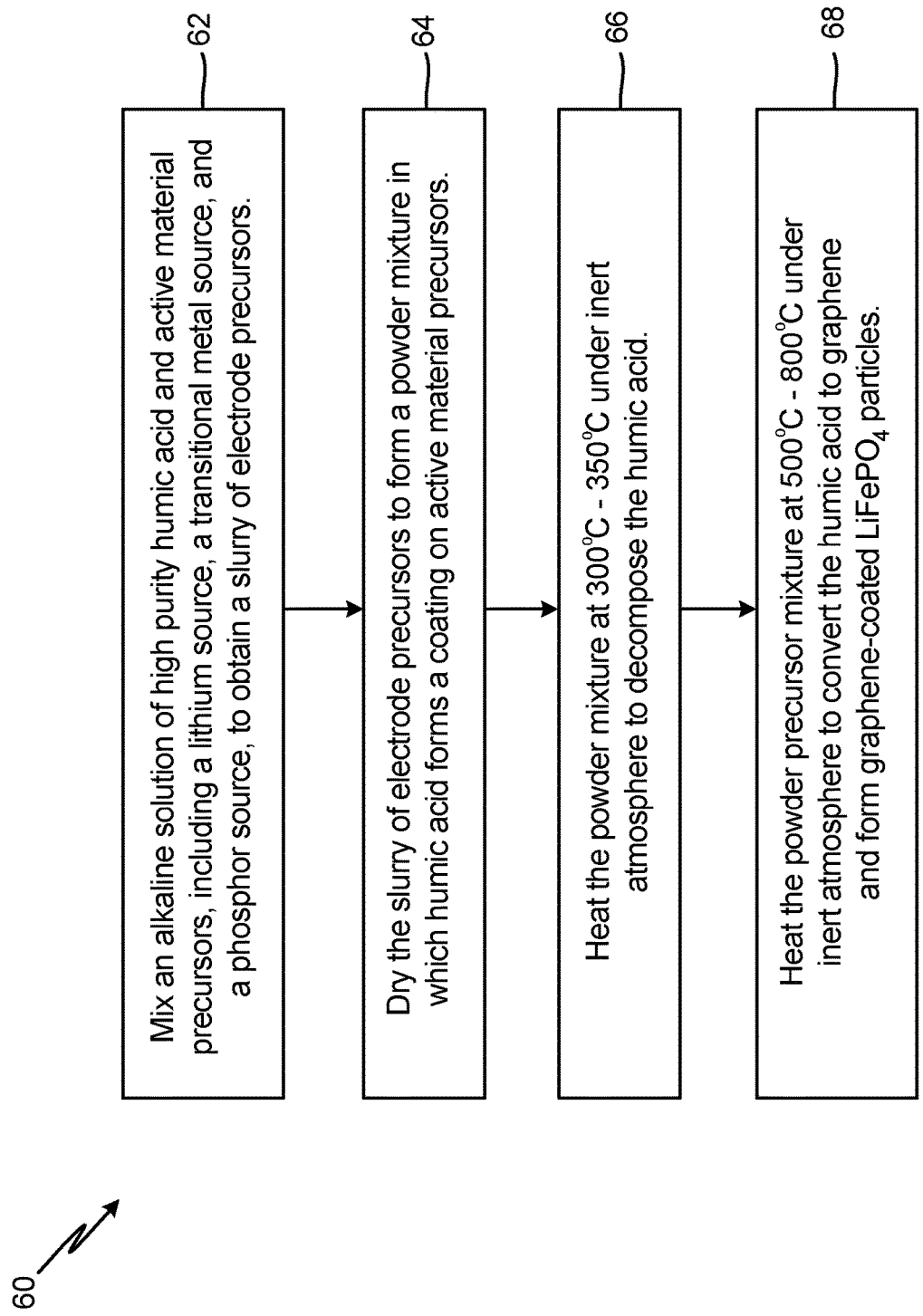
FIG. 3 is a flow chart for a method for producing graphene-coated cathode material.
Figure 4:
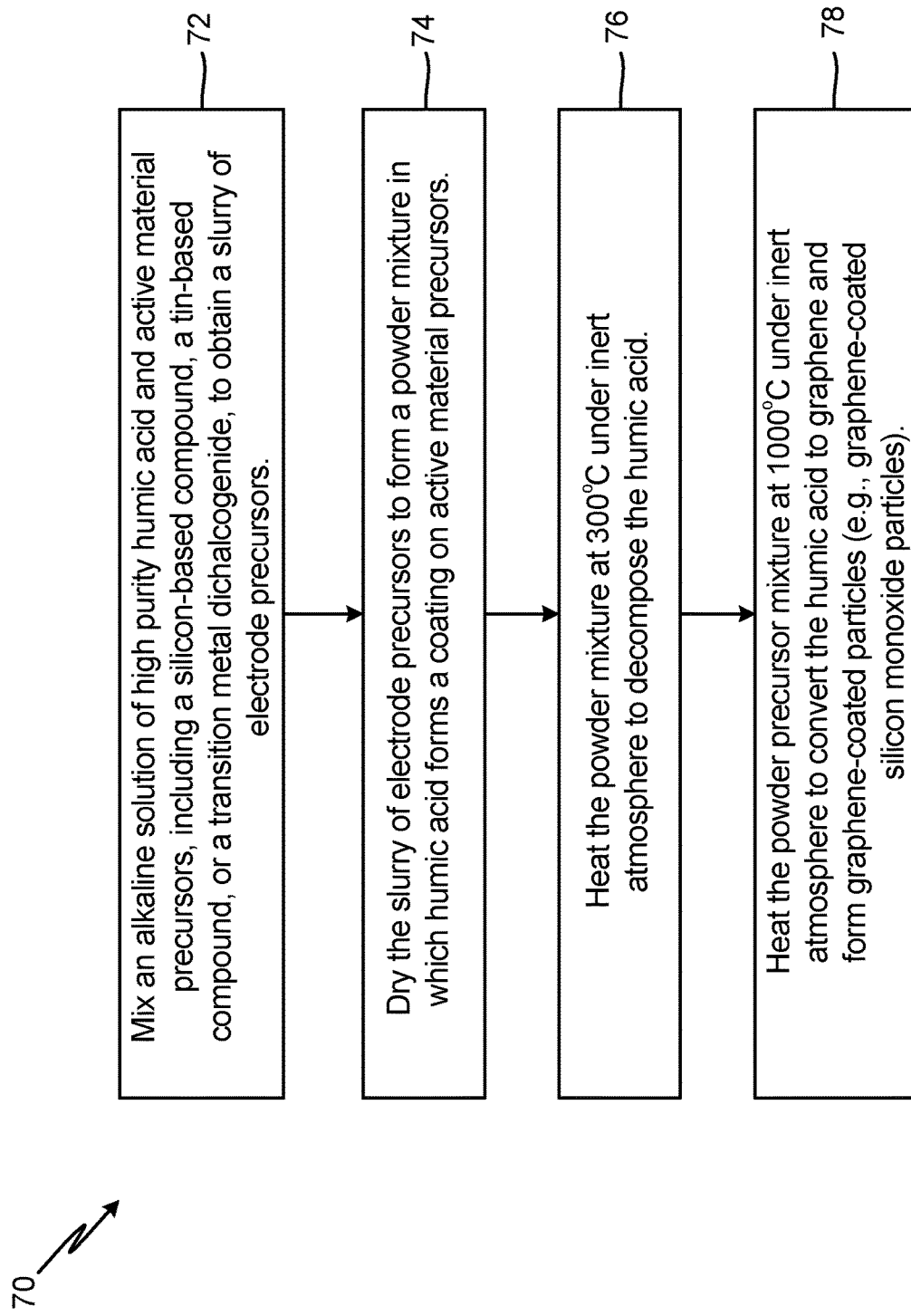
FIG. 4 is a flow chart for a method for producing graphene-coated anode material.

FIG. 2 is a flow diagram of a method for producing graphene-coated electrode material using the high purity humic acid produced using method 10 of FIG. 1. The graphene-coated electrode material can be produced for cathode or anode materials for use in lithium-ion batteries. FIG. 3 is a method flow chart following the flow diagram of FIG. 2 and specific to the production of a graphene-coated cathode material. FIG. 4 is a method flow chart following the flow diagram of FIG. 2 and specific to the production of a graphene-coated anode material.

FIG. 2 shows feedstock 12 and high purity humic acid 14 extracted from feedstock 12 using method 10 of FIG. 1. As used herein, the term "high purity" refers to a humic acid having an organic content of greater than 98% (or ash content <2%). FIG. 2 additionally shows active electrode material precursors 40, mixing element 42, slurry 44, drying element 46, powder 48, heating element 50, and graphene-coated electrode material 52. FIG. 2 is provided to generally illustrate the disclosed method of producing graphene-coated electrode materials using coal-derived high-purity humic acid 14.

As discussed with respect to FIG. 1, feedstock 12 can be a low-rank coal, such as lignite or naturally oxidized lignite (Leonardite) having higher molecular weight humic acid than other humic acid sources, such as soil and decayed organic matter. The higher molecular weight humic acid can produce graphene molecules of larger lateral dimensions. Additionally, the higher molecular weight can facilitate homogenization of electrode precursors in the slurry by functioning as a better polymeric dispersant through increasing the viscosity of the solution than a lower molecular weight counterpart. High purity humic acid 14 can have an ash (i.e., impurity) content of less than 2%. An ash content of less than 2% is necessary to provide a battery level of raw material, which requires a purity of greater than 99%. The high purity humic acid 14 contributes approximately 0.2% to 0.6% impurity to the total raw materials.

An aqueous alkaline solution of high purity humic acid 14 and active electrode precursors 40 can be mixed in mixing element 42 to form a homogeneous slurry of electrode precursors 44, which includes a homogeneous mixture of active electrode precursors 40 and dissolved humic acid 14. Active electrode precursors 40 can have an average particle size of about 5 μm and can be combined with humic acid 14 in water. Mixing can be accomplished by stirring. Humic acid 14 can be dissolved in an alkaline solution having a pH greater than about 9.5. A pH of greater than 9.5 can be reached with the addition of the active electrode precursor materials (e.g., lithium hydroxide) and/or the addition of a strong base alkali such as ammonium hydroxide. A dispersant can be added to improve separation of precursor materials. Suitable dispersants can include polymeric dispersants such as carboxymethylcellulose. Polymeric dispersants can significantly reduce the polarity of water solutions and have excellent wetting and film-forming properties, which can provide complete and even surface modification of the active electrode precursor materials with humic acid. In this manner, humic acid 14 can uniformly coat active electrode precursor materials 40. The ability of humic acid to dissolve in water makes it a better candidate for in-situ graphene formation than other graphene precursor materials such as graphene oxide, which does not dissolve but only disperses in water providing incomplete coverage and inconsistent electrode materials.

Slurry 44 can have a total solid content ranging from approximately 20 wt. % to about 80 wt. % with humic acid 14 content ranging from approximately 5 wt. % to about 90 wt. % of the total solid content, and preferably, about 5 wt. % to about 20 wt. % of the total solid content. The ratio of active electrode precursors 40 to humic acid 14, can be selected to optimize electrochemical performance of a lithium-ion battery. Electrode capacity is primarily a function of the active electrode material. The carbon content provided by the graphene coating produced in-situ from humic acid 14 contributes minimally to the capacity but improves conductivity. Too much carbon can reduce the density of the active electrode material, which results in low specific capacity, while too little carbon results in low conductivity and poor cell performance.

Slurry 44 is dried to produce a fine powder of humic acid-coated electrode precursor materials 48. Drying can be provided, for example, by a mechanical agitator or magnetic stirrer and heat, or spray drier 50, as illustrated in FIG. 2. Other suitable slurry drying mechanisms, as known in the art, can be used. Depending on the type of drying mechanism employed, additional post-dry mechanical grinding may be required to break up powder aggregates to produce a fine powder having an average particle size of less than about 10 μm. Use of spray drying can eliminate the need for post-dry grinding. Spray drying can produce humic acid-coated electrode precursor materials 48 having an average particle size of less than about 10 μm and, therefore, does not require additional grinding. In the disclosed embodiments, average particle size of precursor materials 48 can range from about 5 μm to about 10 μm. The solid content of slurry 44 is preferably between 40 wt. % and 60 wt. % for spray drying application. An inlet hot air temperature for spray drying element 50 can be between about 150° C. and 200° C. An outlet air temperature from spray drying element 50 can be between about 75° C. and 85° C.

Humic-acid coated electrode precursor powder particles 48 have a thin coating of humic acid, generally less than 10 nm and generally about 5 nm, which translates to about 15 layers of humic acid and subsequently graphene. When converted to graphene, this thin coating can provide better electrical conductivity than thicker nanographene platelets used in prior art lithium-ion battery electrode manufacture.

Humic-acid coated electrode precursor powder 48 can be transferred to heating element 52. Heating element 52 can be a furnace with inert atmosphere. The inert atmosphere can be, for example, nitrogen or argon. Powder 48 can be heated in a first heating step within a range of about 300° C. to about 350° C. under inert atmosphere for about two hours to decompose humic acid 14. Temperature and heating time can be adjusted based on humic acid content in electrode precursor powder 48 to optimize decomposition. At temperatures below about 300° C., the decomposition will be significantly slowed and incomplete. In the process of decomposition, humic acid 14 loses functional groups (e.g., carbonic acid, alcoholic hydroxyl, phenolic hydroxyl and other heteroatomic groups). During this heating process, the weight of the humic acid can be reduced by approximately 50% attributed to the loss of those functional groups, and the coating can be decomposed to carbon with low crystallinity, (i.e., the carbon is amorphous at large).

Temperature can be elevated in a second carbonization heating step to a temperature within the range of about 500° C. to about 1200° C. for a period of about 3 hours to about 12 hours to convert the humic acid coating to a graphene coating thereby producing graphene-coated electrode material 52. As discussed further herein, the presence of graphene-like carbon has been confirmed with Raman analysis. The temperature and heating time can be selected based on the type of active electrode precursor material and chemical reactions of active electrode precursor materials that occur at varying temperatures.

The resulting graphene-coated electrode material 52 can have high crystalline structure as shown by a low $I_D/I_G$ ratio about 0.5 on the Raman spectra with graphene evenly distributed on the surface of the active electrode material. Due complexity of its chemical structure, humic acid will generate a naturally porous coating instead of a full and tight wrapping of the electrode particles. Ideal graphene, which contains only carbon with no defects can inhibit lithium ion transport and, therefore, can require the introduction of defects or pores for use in LIBs. In-situ conversion of graphene from humic acid can provide a thin uniform layer of graphene with natural porosity for lithium ion transport.

The methods disclosed herein for in-situ synthesis of graphene-coated electrode materials can be used to produce electrode materials at a significantly reduced cost as compared to other graphene-coated electrode manufacture methods and at a high rate of production. Additionally, the graphene-coated electrode materials of the present disclosure have been shown to provide improved battery performance over commercially available lithium-ion battery electrode materials.

In-Situ Synthesis of Graphene-Coated Cathode Materials for Li-Ion Battery

FIG. 3 is a method flow chart following the flow diagram of FIG. 2 and specific to the production of a graphene-coated cathode material and, specifically, the production of graphene-coated polyanion cathodes such as lithium metal phosphate (LMP/G). FIG. 3 shows method 60 for forming LMP/G. As described with respect to FIG. 2, an alkaline aqueous solution of high purity humic acid 14 and active material precursors 40 are mixed in mixing element 42 (step 62) to provide a homogeneous slurry of electrode precursors 44, which includes a homogeneous mixture of active electrode precursors 40 and dissolved humic acid 14. Active material precursors 40 include a lithium source, a transitional metal source, and a polyanion source. The lithium source can be, for example, lithium hydroxide or lithium carbonate. Lithium hydroxide may be preferred as providing both a source of lithium and a base to maintain an alkaline solution. The transitional metal element can be, for example, iron, manganese, cobalt, nickel, and vanadium. The polyanion source can be, for example, phosphate and silicate. The transitional metal and polyanion source can be a compound of metal and polyanion, such as iron phosphate ($FePO_4$). Other sources of iron and phosphorous are known in the art and can be used in the disclosed method. The active materials disclosed provide low electrical conductivity discharging.

Active material precursors 40 can be added at a mole ratio equal to or close to the stoichiometric ratio 1:1:1 necessary for complete reaction between the materials without the introduction of impurities. The aqueous alkaline solution can be maintained at a pH greater than about 9.5 to dissolve humic acid 14. The pH of 9.5 can be provided with addition of a strong base alkali such as ammonium hydroxide. If lithium hydroxide is provided as the source of lithium, no additional base is needed. As described with respect to FIG. 2, a dispersant can be added to improve separation of precursor materials. Suitable dispersants can include polymeric dispersants such as carboxymethylcellulose. The rich functional groups of humic acid 14 can ensure a complete and uniform surface modification of the polar active electrode precursors particles 40.

Slurry 44 can have a total solid content ranging from approximately 20 wt. % to about 80 wt. % with humic acid 14 content ranging from approximately 5 wt. % to about 90 wt. % of the total solid content, and preferably, about 5 wt. % to about 20 wt. % of the total solid content. The ratio of active electrode precursors 40 to humic acid 14 can be selected to optimize electrochemical performance of a lithium-ion battery. Electrode capacity is primarily a function of the active electrode material. The carbon content provided by the graphene coating produced in-situ from humic acid 14 contributes minimally to the capacity but improves conductivity. Too much carbon can reduce the density of the active electrode material, which results in low specific capacity, whereas too little carbon results in low conductivity and poor cell performance.

Slurry 44 is dried to produce a fine powder of humic acid-coated electrode precursor materials 48 (step 64). Drying can be provided, for example, by a mechanical agitator or magnetic stirrer and heat, or spray drier 50, as illustrated in FIG. 2. Other suitable slurry drying mechanisms, as known in the art, can be used. Depending on the type of drying mechanism employed, additional post-dry mechanical grinding may be required to break up powder aggregates to produce a fine powder having an average particle size of less than about 10 µm. Use of spray drying can eliminate the need for post-dry grinding. Spray drying can produce humic acid-coated electrode precursor materials 48 having an average particle size of less than about 10 µm and, therefore, does not require additional grinding. In the disclosed embodiments, average particle size of precursor materials 48 can range from about 5 µm to about 10 µm. The solid content of slurry 44 is preferably between 40 wt. % and 60 wt. % for spray drying application. An inlet hot air temperature for spray drying element 50 can be between about 150° C. and 200° C. An outlet air temperature from spray drying element 50 can be between about 75° C. and 85° C.

Humic-acid coated electrode precursor powder particles 48 have a thin coating of humic acid, generally less than 10 nm and preferably about 5 nm or less, which translates to about 15 layers of humic acid and subsequently graphene. When converted to graphene, this thin coating can provide better electrical conductivity than thicker nanographene platelets used in prior art lithium-ion battery electrode manufacture.

Humic-acid coated electrode precursor powder 48 can be transferred to heating element 52. Heating element 52 can be a furnace with inert atmosphere. The inert atmosphere can be, for example, nitrogen or argon. Powder 48 can be heated in a first heating step within a range of about 300° C. to about 350° C. under inert atmosphere for about two hours to decompose humic acid 14 (step 66). Temperature and heating time can be adjusted based on humic acid content in electrode precursor powder 48 to optimize decomposition. In the process of decomposition, humic acid 14 loses functional groups (e.g., carbonic acid, alcoholic hydroxyl, phenolic hydroxyl and other heteroatomic groups). During this heating process, the weight of the humic acid can be reduced by approximately 50% attributed to evaporation of moisture in the humic acid, and the coating can be decomposed to carbon with low crystallinity, (i.e., the carbon is amorphous at large).

Temperature can be elevated in a second carbonization heating step to a temperature within the range of about 500° C. to about 800° C. for a period of about 4 hours to about 12 hours to convert the humic acid coating to a graphene coating and to react the lithium source with the transition metal and phosphorous source to form the LMP/G material 52 (step 68). The temperature and heating time can be selected based on the type of active electrode precursor material and chemical reactions of active electrode precursor materials that occur at varying temperatures. For example, a temperature of 600° C. to 750° C. is suitable for production of lithium iron phosphate ($LiFePO_4$).

The resulting LMP/G material 52 can have high crystalline structure (as shown by a low $I_D/I_G$ ratio about 0.5 on the Raman spectra) with graphene evenly distributed on the surface of the LMP. Due complexity of its chemical structure, humic acid will generate a naturally porous coating instead of a full and tight wrapping of the electrode particles. Ideal graphene, which contains only carbon with no defects can inhibit lithium ion transport and, therefore, can require the introduction of defects or pores for use in LIBs. In-situ conversion of graphene from humic acid can provide a thin uniform layer of graphene with natural porosity for lithium ion transport.

EXAMPLE 2

Graphene-coated lithium iron phosphate (LFP/G) cathode material was formed according to the following method. 269.736 g of lithium hydroxide (LiOH) was fully dissolved in 4.8 L of deionized water followed by the addition of 253.2 g humic acid (extracted from North Dakota Leonardite and purified according method 10) having a purity of approximately 98.8%. The mixture was stirred for about one hour until a homogeneous solution was obtained. 1200 g of iron phosphate hydrate ($FePO_4 \cdot 2H_2O$) was added into the solution and stirred for at least five hours. 60 g of carboxymethylcellulose was added as a dispersant and stirring continued for about 12 hours to obtain a homogeneous slurry of electrode precursors.

The thoroughly mixed slurry was spray dried into fine powders using a lab-scale spray-drier having 0.5 mm caliber nozzle, inlet hot air temperature of 220° C., outlet air temperature of 85° C., and feeding speed of 10 mL/min. The spray-dried powder had an average particle size between 5-10 μm.

The spray-dried powder was transferred to a tube furnace and heated at 320° C. at a ramp rate of 5° C./min under inert atmosphere for two hours to decompose the humic acid. The temperature was increased at a rate of 5° C./min to 700° C. and held at temperature for 8 hours to convert the humic acid to a graphene coating and to react the lithium hydroxide with the iron phosphate to form the LFP/G particles. The final LFP/G material was obtained by cooling to room temperature.

Raman analysis was conducted to inspect the final LFP/G particles to determine a ratio of ordered to amorphous carbon. Raman spectra showed a high degree of ordered carbon, indicative of graphene, with a ratio of peak intensities at 1350 $cm^{-1}$ and 1580 $cm^{-1}$ of 0.66 ($I_{D(1350)}/I_{G(1580)}$ is the intensity ratio of the disordered and graphitic (ordered or crystalline) carbon atoms on the Raman spectra). Scanning electron microscope images show a homogeneous mixture with particles fairly uniform in size with no obvious irregularities or anomalies. No carbon-rich regions were observed, indicating that the dissolved humic acid in the precursor slurry interacted with the LFP precursors at a molecular level, resulting in a thin even coating graphitized carbon on the LPF particles as opposed to large carbon agglomerations, which has been shown to occur with prior art methods in which graphene or graphene oxide is mixed with LPF precursors. Carbon content was approximately 4.4%, which translates to a beneficial higher active material content and energy density. X-ray diffraction analysis verified the purity of the LFP/G crystalline structure with a purity of greater than 99.5% determined by Rietveld analysis.

In-Situ Synthesis of Graphene-Coated Anode Materials for Li-Ion Battery

FIG. 4 is a method flow chart following the flow diagram of FIG. 2 and specific to the production of a graphene-coated anode material. FIG. 4 shows method 70 for forming graphene-coated anode material. As described with respect to FIG. 2, an alkaline solution of high purity humic acid 14 and active material precursors 40 are mixed in mixing element 42 (step 72) to provide a homogeneous slurry of electrode precursors 44, which includes a homogeneous mixture of active electrode precursors 40 and dissolved humic acid 14. Active electrode precursors 40 can have an average particle size of about 5 μm. Active material precursors 40 can include a silicon-based precursor, a tin-based precursor, or a transition metal dichalcogenide. The active materials are promising next-generation anodes because of their high theoretic capacities. Silicon is an attractive anode material for lithium-ion batteries because it has a high theoretical capacity of 4200 mAh/g and low operating voltage. However, a large volume change during lithiation/delithiation that can cause fracture of the silicon particles, delamination of the conductive coating, and thus rapid capacity decay upon cycling. Compared with elemental silicon, SiO is closer to practical application due to its much higher cycling stability, in spite of a compromised theoretical capacity of 2400 mAh $g^{-1}$. The Si—O bond (452 kJ/mol) is twice as strong as a Si—Si bond (223 kJ/mol), which results in a much smaller volume change (200%) during lithiation/delithiation. In addition, the $Li_2O$ and Li silicates formed during the initial lithiation of SiO act as a buffer to further alleviate the expansion and shrink of Si clusters, resulting in improved cycling stability. Nevertheless, the low intrinsic electronic conductivity and low initial coulombic efficiency of SiO lead to poor rate performance and fast capacity decay. Many of these issues can be solved with the incorporation of a graphene coating. However, while graphene-coated silicon has been identified as a particularly promising anode material, several issues have limited its practical use. The disclosed method for in-situ conversion of humic acid-coated active material precursors to graphene-coated active material precursors has been shown to overcome many of the issues limiting manufacture of graphene-coated silicon anode material.

The aqueous alkaline solution can be maintained at a pH greater than about 9.5 to dissolve humic acid 14. The pH of 9.5 can be provided with addition of a strong base alkali such as ammonium hydroxide. Ammonium hydroxide can be preferred to other strong bases to avoid the introduction of other metals to the electrode material. The rich functional groups of humic acid 14 can ensure a complete and uniform surface modification of the polar active material precursor particles, creating "dot-on-plane" contact.

Slurry 44 can have a total solid content ranging from approximately 20 wt. % to about 80 wt. % with humic acid 14 content ranging from approximately 5 wt. % to about 90 wt. % of the total solid content, and preferably, about 5 wt. % to about 20 wt. % of the total solid content. The ratio of active electrode precursors 40 to humic acid 14 can be selected to optimize electrochemical performance of a lithium-ion battery. Electrode capacity is primarily a function of the active electrode material. The carbon content provided by the graphene coating produced in-situ from humic acid 14 contributes minimally to the capacity but improves conductivity. Too much carbon can reduce the density of the active electrode material, which results in low specific capacity, whereas too little carbon results in low conductivity and poor cell performance.

Slurry 44 is dried to produce a fine powder of humic acid-coated electrode precursor materials 48 (step 74). Drying can be provided, for example, by a mechanical agitator or magnetic stirrer, or spray drier 50, as illustrated in FIG. 2. Other suitable slurry drying mechanisms, as known in the art, can be used. Depending on the type of drying mechanism employed, additional post-dry mechanical grinding may be required to break up powder aggregates to produce a fine powder having an average particle size of less than about 10 µm. Use of spray drying can eliminate the need for post-dry grinding. Spray drying can produce humic acid-coated electrode precursor materials 48 having an average particle size of less than about 10 µm and, therefore, does not require additional grinding. In the disclosed embodiments, average particle size of precursor materials 48 can range from about 5 µm to about 10 µm. The solid content of slurry 44 is preferably between 40 wt. % and 60 wt. % for spray drying application. An inlet hot air temperature for spray drying element 50 can be between about 150° C. and 200° C. An outlet air temperature from spray drying element 50 can be between about 75° C. and 85° C.

Humic-acid coated electrode precursor powder particles 48 have a thin coating of humic acid, generally less than 10 nm and preferably about 5 nm or less, which translates to about 15 layers of humic acid and subsequently graphene. When converted to graphene, this thin coating can provide better electrical conductivity than thicker nanographene platelets used in prior art lithium-ion battery electrode manufacture.

Humic-acid coated electrode precursor powder 48 can be transferred to heating element 52. Heating element 52 can be a furnace with inert atmosphere. The inert atmosphere can be, for example, nitrogen or argon. Powder 48 can be heated in a first heating step within a range of about 300° C. to about 350° C. under inert atmosphere for about two hours to decompose humic acid 14 (step 76). Temperature and heating time can be adjusted based on humic acid content in electrode precursor powder 48 to optimize decomposition. At temperatures below about 300° C., the decomposition will be significantly slowed and incomplete. In the process of decomposition, humic acid 14 loses functional groups (e.g., carbonic acid, alcoholic hydroxyl, phenolic hydroxyl and other heteroatomic groups). During this heating process, approximately 50% of the humic acid coating can be reduced to graphene having a crystalline structure, while much of carbon will remain amorphous.

Temperature can be elevated in a second carbonization heating step to a temperature within the range of about 500° C. to about 1200° C. for a period of about 8 hours to convert the humic acid coating to a graphene coating (step 78). The temperature and heating time can be selected based on the type of active electrode precursor material and chemical reactions of active electrode precursor materials that occur at varying temperatures. For example, a carbonization temperature range of about 900° C. to about 1000° C. is suitable for silicon monoxide (SiO). Higher temperatures can provide more ordered carbon; however, temperature should be limited to avoid reaction of the active material. For example, above about 1000° C., silicon monoxide will be converted to silica. A carbonization temperature up to about 1200° C. can be used for pure silicon. Above this temperature, silicon carbonite can form. A carbonization temperature of about 500° C. is suitable for tin.

The resulting graphene-coated anode material 52 can have high crystalline structure as shown by a low $I_D/I_G$ ratio about 0.5 on the Raman spectra with graphene evenly distributed on the surface of the active electrode material. Due complexity of its chemical structure, humic acid will generate a naturally porous coating instead of a full and tight wrapping of the electrode particles. Ideal graphene, which contains only carbon with no defects can inhibit lithium ion transport and, therefore, can require the introduction of defects or pores for use in LIBs. In-situ conversion of graphene from humic acid can provide a thin uniform layer of graphene with natural porosity for lithium ion transport.

EXAMPLE 3

Graphene-coated silicon monoxide (SiO/G) anode material was formed according to the following method. 2 g of pristine SiO powder, having a particle size of 3-7 µm, and 0.5 g high purity humic acid (extracted from North Dakota Leonardite and purified according method 10), having a purity of 97.6%, were mixed in 25 mL deionized water. 2 mL of 28-30% ammonium hydroxide was added dropwise into the mixture to dissolve the humic acid and maintain a pH above 9.5. The mixture was stirred from one hour and then heated at 80° C. with continuous stirring to evaporate the ammonia and cause the humic acid to precipitate on the surface of the silicon monoxide particles. The humic acid surface-modified silicon monoxide was ground by mortar and pestle for about 15 minutes and then sintered at 300° C. for about 2 hours. The material was subsequently heated at 1000° C. for about 8 hours in high-purity argon atmosphere. The graphene-coated silicon monoxide anode material was obtained upon cooling to room temperature.

The resulting graphene-coated electrode material 52 can have high crystalline structure as shown by an $I_D/I_G$ ratio of about 1 on the Raman spectra with graphene evenly distributed on the surface of the active electrode material. The characteristic peaks of crystalline silicon on the X-ray diffraction pattern reflects the thermal disproportionation reaction of amorphous SiO:

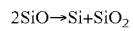

$$2SiO \rightarrow Si + SiO_2$$

A small but sharp peak appearing at about 2θ=26.6° on the XRD pattern can be attributed to the graphitic nature of the coating. The phase evolution is also in a good agreement with the above Raman spectra. Chemical etching of the SiO/G particles showed a thin and even coating that preserved its original shape. High-resolution transmission electron microscopy (HRTEM) and Energy Dispersive Spectroscopy (EDS) disclosed a graphene shell having a thickness of 5 nm and Si nanocrystal clusters embedded in the amorphous phase ($SiO_x$ matrix).

Figure 5:
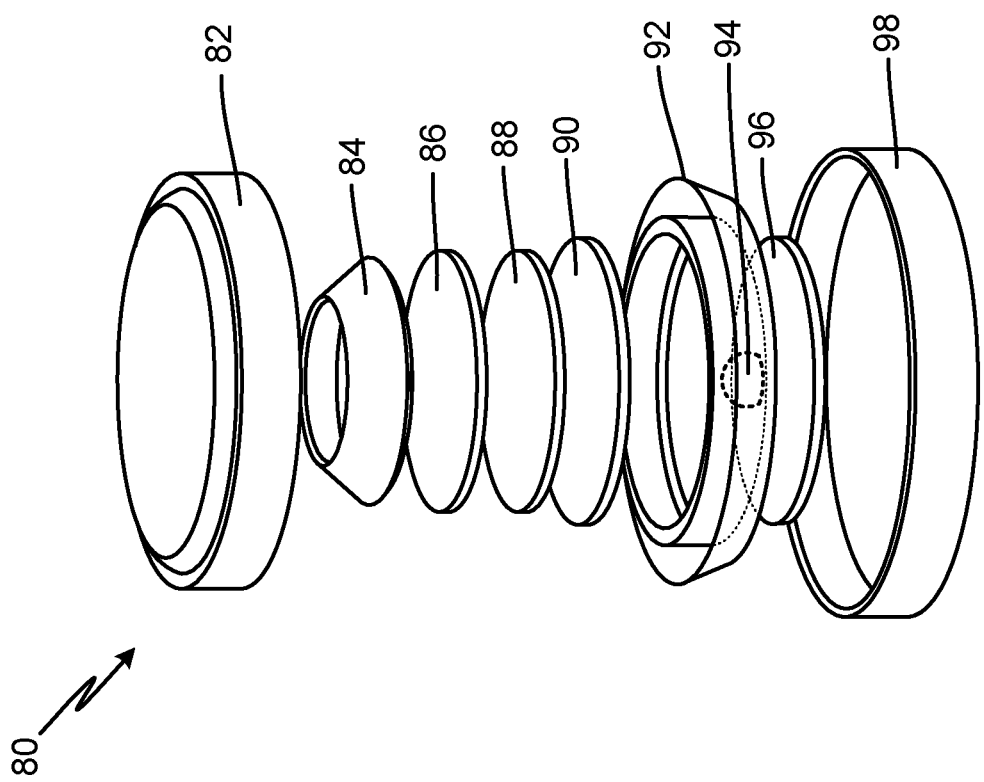
FIG. 5 is an exploded view of a lithium-ion coin battery with an electrode comprising the graphene-coated electrode material produced using the method of FIG. 2.

FIG. 5 is an exploded view of a lithium-ion coin battery with an electrode comprising the graphene-coated electrode material produced using the method of FIG. 2. FIG. 5 shows lithium-ion coin cell battery 80 having coin cell cap 82, washer 84, spacer 86, lithium 88, separator 90, gasket 92, electrolyte 94, electrode 96, and coin cell can 98. Coin cell battery 80 is a half-cell battery. Half-cell batteries are electrochemical cells having an electrode (anode or cathode) as the working electrode and lithium foil as a counter electrode. Electrode 96 can be an anode or a cathode. An anode can include a graphene-coated anode material formed according to the method of FIG. 4. Cathode can include graphene-coated cathode material formed according to the method of FIG. 3. Coin cell battery 80 can be assembled with methods and materials known in the art. Electrode 96 can be placed in coin cell can 98, followed by sealing gasket 92, electrolyte 94, separator 90, lithium foil counter electrode 88, spacer 86, and spring washer 84. Separator 94 can be a microporous monolayer polypropylene membrane battery separator (e.g., Celgard 2400). Electrolyte 94 can be 1.2 M $LiPF_6$ in EC/DMC/EMC (1:1:1 by volume) with 10 wt. % FEC. Spring washer 84 can be provided to improve contact with coin cell cap 82.

Use of the disclosed graphene-coated electrode materials is not limited the half-cell lithium-ion coin cell battery 80 disclosed. Graphene-coated anode materials and cathode materials disclosed herein can be used in full-cell lithium-ion battery assemblies. Furthermore, graphene-coated anode materials and cathode materials disclosed herein can be combined in a full-cell lithium-ion battery assembly, providing the anode and cathode, respectively.

Electrode 88 can be formed by preparing a slurry of graphene-coated anode material or graphene-coated cathode material formed according to the methods of FIGS. 3 and 4, respectively, a conductive agent, and binder. The slurry can be applied as a coating to an aluminum or copper foil, which serves as a current collector, as known in the art.

EXAMPLE 4

An electrode slurry was prepared by mixing LFP/G cathode material, carbon black, and polyvinylidene fluoride at a mass ratio of 80:10:10 in N-methyl-2-pyrrolidone by magnetic stirring. Then the slurry was coated onto an aluminum foil at a thickness of 100-140 μm and dried in a vacuum at 100° C. for approximately 12 hours.

EXAMPLE 5

An electrode slurry was prepared by mixing SiO/G anode material, acetylene black, and carboxymethyl cellulose and styrene-butadiene rubber at a mass ratio of 60:20:8:12 in deionized water by a magnetic stir bar. The slurry was coated onto a copper foil and dried in a vacuum at 100° C. for approximately 12 hours.

Electrochemical Performance

Half-cell lithium-ion coin cell batteries fabricated with LFP/G cathode material according to Example 4, and half-cell lithium-ion coin cell batteries fabricated with SiO/G anode material according to Example 5, were tested by galvanostatic charge-discharge testing between 0.001 V and 2.0 V (vs. Li/Li$^+$) on a Neware battery testing system (CT-4008, Neware Technology Limited, Shenzhen, China). The current densities and specific capacities were calculated based on the mass of active materials in the working electrode. Cyclic voltammetry (CV) and electrochemical impedance spectroscopy (EIS) were performed on a Gamry Series G 750 electrochemical workstation (Gamry Instruments, Warminster, USA). CV measurements were conducted in the voltage range of 0.01 V to 2.5 V at 0.01 mVs$^{-1}$. EIS measurements were carried out at an AC voltage of 10 mV amplitude and frequency from 300 kHz to 0.01 Hz. A comparison of charging profiles for coin cell batteries fabricated with the disclosed LFP/G and a conventional LFP reference sample showed an increase in specific capacity as indicated by a final capacity of the discharge curve at a lower cut-off point of 2.5 volts (specific capacity of 145 mAh/g for the LFP/G as compared to 118 mAh/g for the LFP reference sample). It is believed that the increase in specific capacity is likely due to the disclosed fabrication method, which allows for molecular level mixing and interaction between LFP precursors and humic acid, as well as reduced carbon content. Cycling tests indicated a 20% higher capacity for the LFP/G cells as compared to the LFP reference sample over more than 300 cycles at a charge/discharge rate of 1.0 C. Rate performance tests conducted in which cells were cycled at 1 C, 2 C, and 5 C charge/discharge rates and then returned to a rate of 1 C showed that the LFP/G coin cell battery displayed the highest capacity at all rates, retaining a capacity of almost 95 mA/g even at a 5 C charge/discharge rate. The SiO/G anode exhibited excellent cycling performance and rate capabilities and high reversible specific capacities of 1023 mAh g$^{-1}$ and 774 mAh g$^{-1}$ at a current density of 2 A g$^{-1}$ and 5 A g$^{-1}$, respectively, along with an initial coulombic efficiency (ICE) of 78.2%.

Full cells were fabricated using the LPF/G cathode material and SiO/G anode material with a capacity ratio of negative to positive (N/P) ratio of 1.15. The SiO/G anode was prelithiated to improve the coulombic efficiency in the first cycle. The assembled full coin cell demonstrated an increase of charge-discharge rate from 0.1 C to 1 C (1 C=170 mA g$^{-1}$), with only slight decay of discharge capacities from 135.3 mAh g$^{-1}$ to 119.3 mAh g$^{-1}$. Cycling test within the cell potential range of 2.0-3.8 V at 1 C showed capacity of 75% after 100 cycles.

The novel and cost-effective method of producing high purity humic acid from a low-value coal as disclosed herein can be used to advance LIB technology. Graphene-coated electrode materials synthesized in-situ using high purity humic acid as a graphene precursor according to the methods disclosed herein can provide improved performance over existing LIB electrode technology. Additionally, the methods disclosed herein can be used to manufacture low cost graphene-coated electrode materials with high consistency. The disclosed graphene-coated cathode materials show improvement in electrochemical performance over conventional cathode materials that have amorphous carbon coatings (i.e., as provided by using sugar as a carbon source) and also show superior coating uniformity and consistency in manufacture over methods using graphene or graphene oxide as the starting carbon source. Similar results have been observed with the disclosed graphene-coated anode materials. Additionally, the present disclosure shows that many of the existing challenges to combining graphene and silicon in anode material development can be overcome with the disclosed use of humic acid as a graphene precursor.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method for producing high purity humic acid from coal includes dissolving coal in an aqueous alkaline solution, removing undissolved material from the aqueous alkaline solution to obtain a humate aqueous solution, acidifying the humate aqueous solution to precipitate ash, removing the ash precipitate to obtain a raw humic acid solution, acidifying the raw humic acid solution to precipitate raw humic acid, and removing metal ion impurities from the raw humic acid to produce humic acid having a purity greater than 98%.

The method of the preceding paragraph can optionally include, additionally and/or alternatively, any one or more of the following features, configurations, additional components, and/or steps:

The method of the preceding paragraphs, wherein the humate aqueous solution is acidified to a pH of about 7 to precipitate ash.

The method of any of the preceding paragraphs, wherein acidifying raw humic acid solution comprises reducing the pH of the raw humic acid in a first acidification step and a second acidification step.

The method of any of the preceding paragraphs can further include adding a chelating agent, wherein the chelating agent is added following the first acidification step.

The method of any of the preceding paragraphs, wherein the pH of the raw humic acid solution is reduced to a pH of about 2 in the second acidification step to precipitate the raw humic acid from solution.

The method of any of the preceding paragraphs, wherein the pH of the raw humic acid solution is reduced to a pH of about 4 in the first acidification step.

The method of any of the preceding paragraphs can further include washing the raw humic acid precipitate with dilute acid and water.

The method of any of the preceding paragraphs can further include drying the washed humic acid precipitate.

The method of any of the preceding paragraphs can further include washing the dried humic acid precipitate to remove the metal ion impurities from the raw humic acid.

The method of any of the preceding paragraphs, wherein drying the washed humic acid is conducted at a temperature of less than 70° C.

A method of producing an electrode material for a lithium-ion battery includes combining an electrode precursor material and humic acid in an alkaline slurry, drying the alkaline slurry to produce a powder of humic acid-coated electrode precursor material, and heating the powder to produce the electrode material comprising graphene-coated particles.

The method of the preceding paragraph can optionally include, additionally and/or alternatively, any one or more of the following features, configurations, additional components, and/or steps:

The method of the preceding paragraphs can further include mechanically grinding the powder of humic acid-coated electrode precursor material to produce powder having an average particle size of equal to or less than approximately 10 microns.

The method of any of the preceding paragraphs, wherein drying the powder comprises spray-drying the alkaline slurry, wherein spray-drying produces a powder having an average particle size of equal to or less than approximately 10 microns.

The method of any of the preceding paragraphs, wherein heating the powder comprises heating the powder to a temperature within in the range of about 300° C. to about 350° C. in a first heating step.

The method of any of the preceding paragraphs, wherein heating the powder further comprises heating the powder to a temperature within the range of about 500° C. to about 850° C. or within the range of about 900° C. to about 1000° C. in a second heating step.

The method of any of the preceding paragraphs can further include deriving the humic acid from coal by a process including dissolving coal in an aqueous alkaline solution, removing undissolved material from the aqueous alkaline solution to obtain a humate aqueous solution, acidifying the humate aqueous solution to precipitate ash, removing the ash precipitate to obtain a raw humic acid solution, acidifying the raw humic acid solution to precipitate raw humic acid, and removing metal ion impurities from the raw humic acid to produce humic acid having a purity greater than 98%.

The method of any of the preceding paragraphs, wherein the humate aqueous solution is acidified to a pH of about 7 to precipitate ash.

The method of any of the preceding paragraphs, wherein acidifying raw humic acid solution comprises reducing the pH of the raw humic acid in a first acidification step and a second acidification step.

The method of any of the preceding paragraphs can further include adding a chelating agent, wherein the chelating agent is added following the first acidification step.

The method of any of the preceding paragraphs, wherein the pH of the raw humic acid solution is reduced to a pH of about 2 in the second acidification step to precipitate the raw humic acid from solution.

The method of any of the preceding paragraphs, wherein the pH of the raw humic acid solution is reduced to a pH of about 4 in the first acidification step.

The method of any of the preceding paragraphs can further include washing the raw humic acid precipitate with dilute acid and water.

The method of any of the preceding paragraphs can further include drying the washed humic acid precipitate.

The method of any of the preceding paragraphs, washing the dried humic acid precipitate to remove the metal ion impurities from the raw humic acid.

The method of any of the preceding paragraphs can further include drying the washed humic acid is conducted at a temperature of less than 70° C.

The method of any of the preceding paragraphs, wherein the electrode precursor material is an anode precursor material.

The method of any of the preceding paragraphs, wherein the electrode precursor material comprises silicon monoxide.

The method of any of the preceding paragraphs, wherein the electrode precursor material is a cathode precursor material.

The method of any of the preceding paragraphs, wherein the cathode precursor material comprises a source of lithium, a transitional metal, and a source of phosphorous.

The method of any of the preceding paragraphs, wherein the source of lithium is lithium hydroxide.

The method of any of the preceding paragraphs, wherein the alkaline slurry consists of lithium hydroxide, the transitional metal, the source of phosphorous, the humic acid, and water.

The method of any of the preceding paragraphs, wherein the transitional metal and the source of phosphorous is iron phosphate.

The method of any of the preceding paragraphs, wherein the alkaline slurry has a total solid content within the range of about 20 wt. % to about 80 wt. % with a humic acid content in a range of about 5 wt. % to about 90 wt. %.

The method of any of the preceding paragraphs, wherein the humic acid content is in a range of about 5 wt. % to about 20 wt. %.

The method of any of the preceding paragraphs, wherein the alkaline slurry comprises ammonium hydroxide and wherein a pH of the alkaline slurry is maintained above about 9.5.

A method for forming an electrode of a lithium-ion battery can include forming an electrode material according to the method of any of the preceding paragraphs and applying the electrode material to a current collecting foil to form the electrode.

The method of the preceding paragraph can further include assembling the electrode in a lithium-ion battery.

A method of producing an anode material for a lithium-ion battery includes combining an electrode precursor material and humic acid in an alkaline slurry, drying the alkaline slurry to produce a powder of humic acid-coated electrode precursor material, and heating the powder to produce the electrode material comprising graphene-coated particles.

The method of the preceding paragraph can optionally include, additionally and/or alternatively, any one or more of the following features, configurations, additional components, and/or steps:

The method of the preceding paragraphs can further include mechanically grinding the powder of humic acid-coated electrode precursor material to produce powder having an average particle size of equal to or less than approximately 10 microns.

The method of any of the preceding paragraph, wherein drying the powder comprises spray-drying the alkaline slurry, wherein spray-drying produces a powder having an average particle size of equal to or less than approximately 10 microns.

The method of any of the preceding paragraphs, wherein heating the powder comprises heating the powder to a temperature within in the range of about 300° C. to about 350° C. in a first heating step.

The method of any of the preceding paragraphs, wherein heating the powder further comprises heating the powder to a temperature within the range of about 900° C. to about 1000° C. in a second heating step.

The method of any of the preceding paragraphs can further include deriving the humic acid from coal by a process including dissolving coal in an aqueous alkaline solution, removing undissolved material from the aqueous alkaline solution to obtain a humate aqueous solution, acidifying the humate aqueous solution to precipitate ash, removing the ash precipitate to obtain a raw humic acid solution, acidifying the raw humic acid solution to precipitate raw humic acid, and removing metal ion impurities from the raw humic acid to produce humic acid having a purity greater than 98%.

The method of any of the preceding paragraphs, wherein the humate aqueous solution is acidified to a pH of about 7 to precipitate ash.

The method of any of the preceding paragraphs, wherein acidifying raw humic acid solution comprises reducing the pH of the raw humic acid in a first acidification step and a second acidification step.

The method of any of the preceding paragraphs can further include adding a chelating agent, wherein the chelating agent is added following the first acidification step.

The method of any of the preceding paragraphs, wherein the pH of the raw humic acid solution is reduced to a pH of about 2 in the second acidification step to precipitate the raw humic acid from solution.

The method of any of the preceding paragraphs, wherein the pH of the raw humic acid solution is reduced to a pH of about 4 in the first acidification step.

The method of any of the preceding paragraphs can further include washing the raw humic acid precipitate with dilute acid and water.

The method of any of the preceding paragraphs can further include drying the washed humic acid precipitate.

The method of any of the preceding paragraphs can further include washing the dried humic acid precipitate to remove the metal ion impurities from the raw humic acid.

The method of any of the preceding paragraphs, wherein drying the washed humic acid is conducted at a temperature of less than 70° C.

The method of any of the preceding paragraphs, wherein the electrode precursor material comprises silicon monoxide.

The method of any of the preceding paragraphs, wherein the alkaline slurry comprises ammonium hydroxide and wherein a pH of the alkaline slurry is maintained above about 9.5.

The method of any of the preceding paragraphs, wherein the alkaline slurry has a total solid content within the range of about 20 wt. % to about 80 wt. % with a humic acid content in a range of about 5 wt. % to about 90 wt. %.

The method of any of the preceding paragraphs, wherein the humic acid content is in a range of about 5 wt. % to about 20 wt. %.

A method of forming an anode of a lithium-ion battery can include forming an electrode material according to the method any of the preceding paragraphs and applying the electrode material to a copper foil to form the anode.

The method of the preceding paragraph can further include assembling the anode in a lithium-ion battery.

A method of producing a cathode material for a lithium-ion battery includes combining an electrode precursor material and humic acid in an alkaline slurry, drying the alkaline slurry to produce a powder of humic acid-coated electrode precursor material, and heating the powder to produce the electrode material comprising graphene-coated particles.

The method of the preceding paragraph can optionally include, additionally and/or alternatively, any one or more of the following features, configurations, additional components, and/or steps:

The method of the preceding paragraphs can further include mechanically grinding the powder of humic acid-coated electrode precursor material to produce powder having an average particle size of equal to or less than approximately 10 microns.

The method of any of the preceding paragraphs, wherein drying the powder comprises spray-drying the alkaline slurry, wherein spray-drying produces a powder having an average particle size of equal to or less than approximately 10 microns.

The method of any of the preceding paragraphs, wherein heating the powder comprises heating the powder to a temperature within in the range of about 300° C. to about 350° C. in a first heating step.

The method of any of the preceding paragraphs, wherein heating the powder further comprises heating the powder to a temperature within the range of about 500° C. to about 850° C. in a second heating step.

The method of any of the preceding paragraphs can further include deriving the humic acid from coal by a process including dissolving coal in an aqueous alkaline solution, removing undissolved material from the aqueous alkaline solution to obtain a humate aqueous solution, acidifying the humate aqueous solution to precipitate ash, removing the ash precipitate to obtain a raw humic acid solution, acidifying the raw humic acid solution to precipitate raw humic acid, and removing metal ion impurities from the raw humic acid to produce humic acid having a purity greater than 98%.

The method of any of the preceding paragraphs, wherein the humate aqueous solution is acidified to a pH of about 7 to precipitate ash.

The method of any of the preceding paragraphs, wherein acidifying raw humic acid solution comprises reducing the pH of the raw humic acid in a first acidification step and a second acidification step.

The method of any of the preceding paragraphs can further include adding a chelating agent, wherein the chelating agent is added following the first acidification step.

The method of any of the preceding paragraphs, wherein the pH of the raw humic acid solution is reduced to a pH of about 2 in the second acidification step to precipitate the raw humic acid from solution.

The method of any of the preceding paragraphs, wherein the pH of the raw humic acid solution is reduced to a pH of about 4 in the first acidification step.

The method of any of the preceding paragraphs can further include washing the raw humic acid precipitate with dilute acid and water.

The method of any of the preceding paragraphs can further include drying the washed humic acid precipitate.

The method of any of the preceding paragraphs can further include washing the dried humic acid precipitate to remove the metal ion impurities from the raw humic acid.

The method of any of the preceding paragraphs, wherein the electrode precursor material comprises a source of lithium, a transitional metal, and a source of phosphorous.

The method of any of the preceding paragraphs, wherein the source of lithium is lithium hydroxide.

The method of any of the preceding paragraphs, wherein the alkaline slurry consists of lithium hydroxide, the transitional metal, the source of phosphorous, the humic acid, and water.

The method of any of the preceding paragraphs, wherein the transitional metal and the source of phosphorous is iron phosphate.

The method of any of the preceding paragraphs, wherein the alkaline slurry has a total solid content within the range of about 20 wt. % to about 80 wt. % with a humic acid content in a range of about 5 wt. % to about 90 wt. %.

The method of any of the preceding paragraphs, wherein the humic acid content is in a range of about 5 wt. % to about 20 wt. %.

The method of any of the preceding paragraphs, wherein the alkaline slurry comprises ammonium hydroxide and wherein a pH of the alkaline slurry is maintained above about 9.5.

A method of forming a cathode of a lithium-ion battery can include forming an electrode material according to the method of any of the preceding paragraphs and applying the electrode material to an aluminum foil to form the cathode.

The method of the preceding paragraph can further include assembling the cathode in a lithium-ion battery.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of producing a cathode material for a lithium-ion battery, the method comprising:
    combining an electrode precursor material and humic acid in an alkaline slurry, wherein the electrode precursor material comprises a source of lithium, a transitional metal, and a source of phosphorous;
    drying the alkaline slurry to produce a powder of humic acid-coated electrode precursor material; and
    heating the powder to produce the electrode material comprising graphene-coated particles.

2. The method of claim 1, and further comprising:
    mechanically grinding the powder of humic acid-coated electrode precursor material to produce powder having an average particle size of equal to or less than 10 microns.

3. The method of claim 1, wherein drying the alkaline slurry comprises spray-drying the alkaline slurry, wherein spray-drying produces a powder having an average particle size of equal to or less than 10 microns.

4. The method of claim 1, wherein heating the powder comprises heating the powder to a temperature within in the range of 300° C. to −350° C. in a first heating step.

5. The method of claim 4, wherein heating the powder further comprises heating the powder to a temperature within the range of −500° C. to 850° C. in a second heating step.

6. The method of claim 1, and further comprising deriving the humic acid from coal by a process comprising:
    dissolving coal in an aqueous alkaline solution;
    removing undissolved material from the aqueous alkaline solution to obtain a humate aqueous solution;
    acidifying the humate aqueous solution to precipitate ash;
    removing the ash precipitate to obtain a raw humic acid solution;
    acidifying the raw humic acid solution to precipitate raw humic acid; and
    removing metal ion impurities from the raw humic acid to produce humic acid having a purity greater than 98%.

7. The method of claim 6, wherein the humate aqueous solution is acidified to a pH of 7 to precipitate ash.

8. The method of claim 7, wherein acidifying raw humic acid solution comprises reducing the pH of the raw humic acid in a first acidification step and a second acidification step.

9. The method of claim 8, and further comprising:
    adding a chelating agent, wherein the chelating agent is added following the first acidification step.

10. The method of claim 9, wherein the pH of the raw humic acid solution is reduced to a pH of 2 in the second acidification step to precipitate the raw humic acid from solution.

11. The method of claim 10, wherein the pH of the raw humic acid solution is reduced to a pH of 4 in the first acidification step.

12. The method of claim 11, and further comprising:
    washing the raw humic acid precipitate with dilute acid and water; and
    drying the washed humic acid precipitate.

13. The method of claim 12, and further comprising:
    washing the dried humic acid precipitate to remove the metal ion impurities from the raw humic acid.

14. The method of claim 12, wherein drying the washed humic acid is conducted at a temperature of less than 70° C.

15. The method of claim 1, wherein the source of lithium is lithium hydroxide.

16. The method of claim 1, wherein the alkaline slurry consists of lithium hydroxide, the transitional metal, the source of phosphorous, the humic acid, and water.

17. The method of claim 1, wherein the transitional metal and the source of phosphorous is iron phosphate.

18. The method of claim 1, wherein the alkaline slurry has a total solid content within the range of 20 wt. % to 80 wt. % with a humic acid content in a range of 5 wt. % to 90 wt. %.

19. The method of claim 18, wherein the humic acid content is in a range of 5 wt. % to 20 wt. %.

20. The method of claim 1, wherein the alkaline slurry comprises ammonium hydroxide and wherein a pH of the alkaline slurry is maintained above 9.5.

21. A method of forming a cathode of a lithium-ion battery, the method comprising:
   forming an electrode material according to the method of claim 1; and
   applying the electrode material to an aluminum foil to form the cathode.

22. The method of claim 21, and further comprising assembling the cathode in a lithium-ion battery.

* * * * *